United States Patent [19]
Bhattacharyya

[11] Patent Number: 5,843,862
[45] Date of Patent: *Dec. 1, 1998

[54] PROCESS FOR MANUFACTURING AN ABSORBENT COMPOSITION

[75] Inventor: Alakananda Bhattacharyya, Wheaton, Ill.

[73] Assignee: Amoco Corporation, Chicago, Ill.

[*] Notice: The term of this patent shall not extend beyond the expiration date of Pat. No. 5,426,083.

[21] Appl. No.: 736,949

[22] Filed: Oct. 25, 1996

Related U.S. Application Data

[60] Continuation-in-part of Ser. No. 488,872, Jun. 9, 1995, Pat. No. 5,591,418, which is a division of Ser. No. 252,175, Jun. 1, 1994, Pat. No. 5,426,083.

[51] Int. Cl.$^6$ .............................. B01J 20/10; B01J 20/00
[52] U.S. Cl. ......................... 502/411; 502/400; 502/414; 502/415
[58] Field of Search .................................. 502/411, 400, 502/414, 415

[56] References Cited

U.S. PATENT DOCUMENTS

| | | | |
|---|---|---|---|
| Re. 34,164 | 1/1993 | Misra ...................................... | 423/115 |
| 3,539,306 | 11/1970 | Kumura et al. ............................ | 23/315 |
| 3,835,031 | 9/1974 | Bertolacini et al. .................... | 208/120 |
| 3,879,523 | 4/1975 | Miyata et al. ........................... | 423/250 |
| 3,879,525 | 4/1975 | Miyata et al. ........................... | 106/466 |
| 4,146,463 | 3/1979 | Radford et al. ......................... | 208/120 |
| 4,369,108 | 1/1983 | Bertolacini et al. .................... | 208/120 |
| 4,472,267 | 9/1984 | Yoo et al. ............................... | 208/120 |
| 4,539,195 | 9/1985 | Schanz et al. .......................... | 423/419 |
| 4,589,978 | 5/1986 | Green et al. ............................ | 208/113 |
| 4,626,419 | 12/1986 | Lewis et al. ............................ | 423/244 |
| 4,728,635 | 3/1988 | Bhattacharrya et al. ............... | 502/304 |
| 4,774,212 | 9/1988 | Drezdon .................................. | 502/62 |
| 4,790,982 | 12/1988 | Yoo et al. ............................... | 423/239 |
| 4,798,819 | 1/1989 | Lewis et al. ............................ | 502/304 |
| 4,830,840 | 5/1989 | Bhattacharyya ........................ | 423/239 |
| 4,836,993 | 6/1989 | Bertolacini et al. .................... | 423/244 |
| 4,843,168 | 6/1989 | Drezdzon et al. ...................... | 558/357 |
| 4,866,019 | 9/1989 | van Broekhoven ...................... | 502/65 |
| 4,889,615 | 12/1989 | Chin et al. .............................. | 208/113 |
| 4,917,875 | 4/1990 | Moore et al. ........................... | 423/244 |
| 4,946,581 | 8/1990 | van Broekhoven ..................... | 208/120 |
| 4,952,382 | 8/1990 | van Broekhoven ..................... | 423/244 |
| 4,963,520 | 10/1990 | Yoo et al. ............................... | 502/64 |
| 4,973,399 | 11/1990 | Green et al. ............................ | 208/120 |
| 5,246,899 | 9/1993 | Bhattacharyya ........................ | 502/84 |
| 5,288,675 | 2/1994 | Kim ........................................ | 502/65 |
| 5,302,188 | 4/1994 | Neal et al. .............................. | 95/34 |
| 5,383,955 | 1/1995 | Neal et al. .............................. | 95/34 |
| 5,399,537 | 3/1995 | Bhattacharyya et al. ............... | 502/84 |
| 5,426,083 | 6/1995 | Bhattacharyya et al. ............... | 502/411 |

FOREIGN PATENT DOCUMENTS

| | | |
|---|---|---|
| 0318099 | 5/1989 | European Pat. Off. . |
| 1185920 | 3/1970 | United Kingdom . |
| 8706156 | 10/1987 | WIPO . |
| 9110505 | 7/1991 | WIPO . |

OTHER PUBLICATIONS

An article entitled: "Hydrotalcite–type Anionic Clays: Preparation, Properties and Applications" by F. Cavani et al. which, at pp. 173–179, 201–211, and 281–285, appeared in *Catalysis Today* 11 (1991) Elsevier Science Publishers B.V. Amsterdam.

An article entitled: "Catalytic SOx Abatement" by A. Bhattacharyya et al. published in Ind. Eng. Chem. Res., 1988, 27, pp. 1356–1360.

English–language translation of an article by Miyata et al. published in Nippon Kagaku Zasshi, 92 (No. 6), p. 514 (1971).

An Excerpt from *Studies in Surface Science and Catalysis* (vol. 76)—Fluid Catalytic–Cracking: Science and Technology—Chapter 14 entitled: "Additives for the Catalytic Removal of Fluid Catalytic Cracking Unit Flue Gas Pollutants" by Alak Bhattacharyya and Jin S. Yoo ©1993 Elsevier Science Publishers B.V., especially for pp. 551 to 555.

(List continued on next page.)

*Primary Examiner*—Glenn Caldarola
*Assistant Examiner*—In Suk Bullock
*Attorney, Agent, or Firm*—Robert A. Yesukevich; Robert E. Sloat

[57] ABSTRACT

A process for manufacturing a collapsed composition is described in which the manufactured composition is substantially composed of microcrystallites collectively of the formula:

$$M^{2+}_{2m} Al_{2-p} M^{3+}_p T_r O_{7+r\cdot s}$$

where $M^{2+}$ is a divalent metal, $M^{3+}$ is a trivalent metal, and T is vanadium, tungsten, or molybdenum.

The microcrystallites are so small as to be undetectable through conventional x-ray diffraction techniques, yet high resolution electron microscopy reveals that a substantial portion of the microcrystallites are composed of a solid solution having aluminum oxide molecularly dispersed in a divalent metal monoxide crystal structure. Another portion of the microcrystallites are constituted by a spinel phase. The collapsed composition is suitable as a sulfur oxide absorbent, having comparatively high capacity and comparatively fast absorption and desorption rates, and is also suitable as a nitrogen oxide reduction catalyst. The collapsed composition may be produced by heat treating a layered mixed hydroxide clay having interlayer anions in monometalate form. The reagents for the manufacturing process are relatively salt-free, as compared to reagents utilized in previous manufacturing processes.

13 Claims, 5 Drawing Sheets

OTHER PUBLICATIONS

A copy of a letter accepting an abstract of a presentation entitled: "Simultaneous Reduction of SOx and NOx from Fluid Catlaytic Cracking Regenerator" to be delivered at the 1991 Fall Meeting of the Materials Research Society, which presentation was orally delivered by Alak Bhattacharyya in Boston, Massachusetts on Dec. 4, 1991. Applicants believe that no other record of the presentation has been preserved. Excerpt from a trade magazine review entitled: "Environmental Processes '94" which appeared in *Hydrocarbon Processing* (Aug. 1994) at pp. 66–67.

U.S. Patent No. 5,354,932 based on Allowed U.S. Patent Application Serial No. 08/093,768.

Allowed U.S. Patent Application Serial No. 08/252,175 now U.S. Patent No. 5,426,083 Issued Jun. 20, 1995.

An article entitled: "Alkoxides, Metal to Antibiotics (Peptide)" by Kirk–Othmer Encyclopedia of Chemical Technology, vol. 2, pp. 218–227, published by John Wiley & Sons, Inc.

PROCESS FOR MANUFACTURING AN ABSORBENT COMPOSITION

BACKGROUND OF THE INVENTION

This application is a continuation-in-part of allowed U.S. patent application Ser. No. 08/488,872 filed Jun. 9, 1995, now U.S. Pat. No. 5,591,418, which is a divisional of U.S. patent application Ser. No. 08/252,175 filed Jun. 1, 1994, now U.S. Pat. No. 5,426,083. Both of the above-described parent applications are hereby incorporated by reference in their entirety.

I. Field of the Invention

The invention relates to anionic, hydrotalcite-type pillared clay compositions and their heat-treated derivatives. The invention also relates to a process for manufacturing such compositions and heat-treated derivatives.

II. Description of the Prior Art

The development of efficient methods and catalysts for reducing the concentration of air pollutants, such as sulfur oxides and nitrogen oxides, in gaseous mixtures which result from the processing and combustion of sulfur-containing and nitrogen-containing fuels presents a major industrial problem which has interested researchers for a considerable time. For example, U.S. Pat. No. 3,835,031, issued to Bertolacini et al. and assigned to the assignee of the present application, describes a cyclic, fluidized catalytic cracking process operating with a catalyst comprising a molecular sieve in a silica-alumina matrix which is impregnated with one or more Group IIA metal oxides, such as magnesium oxide. By absorbing sulfur oxide within a regeneration zone and, subsequently, releasing the absorbed sulfur within a cracking reaction zone, emission of sulfur oxides in a regenerator stack gas stream is greatly reduced.

Other researchers have noted that absorbents containing rare earth metals are suitable for sulfur oxide removal service. U.S. Pat. No. 4,146,463, issued to Radford et al. and assigned to the assignee of the present invention, describes the absorption of sulfur oxides by modified catalyst particles containing the oxides of rare earth metals, such as cerium, lanthanum and neodymium. The modified catalyst particles reportedly form non-volatile sulfur compounds by reacting with sulfur oxides in a regeneration zone.

Researchers have attempted to identify an optimal structure for sulfur oxides separation catalysts. U.S. Pat. No. 4,626,419, issued to Lewis et al., is directed to a composition of matter for removing sulfur oxides from gases which comprises an alkali metal and a crystalline rare earth oxide, such as cerium oxide, having a crystal size of less than about 90 Angstrom units. The '419 Patent states that improved results measured as a reduction of sulfur in regenerator off-gas may be obtained using oxide crystals in the specified size range.

Sulfur oxide separation catalysts containing magnesium and aluminum crystalline structures in spinel form are reported, for example, in U.S. Pat. No. 4,790,982, issued to Yoo et al., which describes the use of a magnesium and aluminum spinel in conjunction with cerium metal and free magnesia. U.S. Pat. No. 4,728,635, issued to Bhattacharyya et al., is directed to a process for the production of a calcined alkaline earth, aluminum-containing spinel composition for use as a sulfur oxide and nitrogen removal agent.

U.S. Pat. No. 4,865,019, issued to Van Broekhoven, describes sulfur-oxide absorbents which comprise an anionic clay having a hydrotalcite structure. The '019 Patent states that the anionic clay can have a layered structure corresponding to a formula calling for divalent cations, trivalent cations, and anions in specified proportions. Preference is given to divalent cations $Mg^{2+}$ and trivalent cation $Al^{3+}$ alone or combined with $La^{3+}$ and/or $Ce^{3+}$. Anions $NO_3^-$, $OH^-$, $Cl^-$, $Br^-$, $I^-$, $Co_3^{2-}$, $CrO_4^{2-}$, $HPO_4^{2-}$, $HPO_4^{2-}$, $MnO_4^-$, $HGaO_3^{2-}$, $HVO_4^{2-}$, $ClO_4^{2-}$, $BO_3^{2-}$, monocarboxylates, dicarboxylates, alkyl sulfonates, and combinations thereof are listed as suitable. The '019 Patent states that the absorbents are useful after a heat treatment to a temperature in the range of about 300° to about 900° C. which reportedly can involve some decomposition of the hydrotalcite structure.

Anionic layered mixed double hydroxide compositions have a structure similar to the mineral brucite in which divalent ions are octahedrally surrounded by hydroxide anions and the resulting octahedra share edges to form sheets. The sheets, which are one of the identifying characteristics of clays, contain metal cations and hydroxide anions in the ratio of about one to two. Wherever trivalent cations take the place of divalent cations in the sheets, a positive charge results which is balanced by the negative charge of interstitial anions to produce a stable structure. The interstitial anions hold the sheets apart, thereby establishing interstitial layers which are another of the identifying characteristics of clays. For example, in the anionic layered mixed double hydroxide composition known as hydrotalcite, carbonate ions act as interstitial ions to balance positively charged sheets containing divalent magnesium ions, trivalent aluminum ions and negative hydroxide ions. Layered compositions lacking the mixed double hydroxide structure generally perform less favorably as absorbents, as catalysts, or as precursors of absorbents and catalysts.

In addition to naturally-occurring hydrotalcite, layered mixed double hydroxide compositions have been prepared synthetically. For example, U.S. Pat. No. 3,879,525, issued to Miyata et al. describes composite metal hydroxides having layered structures which are prepared from water soluble inorganic salts of divalent metals. The compositions are said to be useful for catalytic purposes, absorbents, desiccants and the like.

A process for the preparation of hydrotalcites is described in U.S. Pat. No. 3,539,306 issued to Kumura et al. The process reportedly comprises mixing an aluminum component such as an aluminum salt, with a magnesium component such as magnesium salt, in an aqueous medium in the presence of carbonate ions. The '306 Patent states that the aluminum component may be any member of the group consisting of aluminum hydroxide, basic aluminum carbonate, aluminum hydroxide-alkalicarbonate complex, aluminum amino acid salt, aluminum alcoholate, water-soluble aluminum salt and water-soluble aluminate. As the magnesium component, the '306 Patent recommends any member of the group consisting of magnesium oxide, magnesium hydroxide, magnesium carbonate and water-soluble magnesium salt. However, the '306 Patent reports no distinction between salt-containing reactants and salt-free reactants.

U.S. Pat. No. 4,539,195 issued to Schanz et al. describes a process for producing a basic magnesium aluminum hydroxycarbonate of the formula $Al_2Mg_6(OH)_{12}(CO_3)_3 \cdot xH_2O$ which reportedly includes the conversion of aluminum hydroxide with basic magnesium carbonate and at least on other compound selected from magnesium hydroxide and magnesium oxide. The conversion is described as taking place at temperatures from about 50° to about 100° C., after which the resulting product purportedly can be spray dried without any intermediate filtration and washing processes. The '195 patent states that the x-ray diffraction spectrum for the aluminum magnesium hydroxycarbonate is distinguishable from the spectrum generally associated with hydrotalcite. Significantly, the formula provided in the '195 Patent is not that of a layered mixed double hydroxide composition.

The preparation of hydrotalcite-type clays with more open galleries, generally known as pillared hydrotalcites, was described in U.S. Pat. No. 4,774,212 issued to Drezdon. The '212 Patent states that anion-pillared hydrotalcite-type clays can be made by combining a magnesium salt, an aluminum salt, and an organic material intended as the interlayer species in an aqueous solution. Reportedly, hydrotalcite having molybdate ions, tungstate ions, and vanadate ions as anionic pillars were prepared. A related procedure was described in U.S. Pat. No. 4,843,168 issued to Drezdon et al.

Traditional processes for manufacturing layered mixed double hydroxide compositions utilize metal salts in solution form as reactants. The metal salt solutions contain dissociated metal cations which are easily dispersed and, therefore, well suited to the formation of sheets in the layered mixed double hydroxide compositions. However, anions liberated by the dissociation of the metal salts form generally undesirable byproducts which degrade the purity of the compositions or, alternatively, necessitate additional separation processes for the removal of the byproducts. Reasonably complete removal of the byproducts typically requires as much as 100 parts by weight of wash water for each part by weight of finished composition. The washing operation and subsequent disposing of the used wash water is burdensome.

U.S. Pat. No. 4,728,635 issued to Bhattacharyya et al. is directed to a process for the production of a calcined alkaline earth, aluminum-containing spinel composition for use as a sulfur oxide removal agent. The '635 Patent describes several preparation procedures, including a procedure which produces a magnesium-rich, magnesium aluminum-containing spinel composition. In the procedure, an aqueous gel-containing slurry was reportedly formed by combining water, formic acid, pseudo-bohemite alumina and magnesia. The slurry was subsequently spray-dried and calcined to produce a relatively salt-free product. However, the proportions of the reactants utilized indicate that the product did not possess a layered structure.

U.S. Pat. No. 5,288,675, issued to Kim, contemplates a $MgO/La_2O_3/Al_2O_3$ ternary oxide base wherein the MgO component is present as a microcrystalline phase which may be detected by x-ray diffraction. The ternary oxide base can reportedly be used in combination with ingredients such as ceria and/or vanadia to control sulfur oxide emissions. The '675 Patent states that the combination can be prepared by a multi-step process which includes reacting an aged, coprecipitated lanthanum and aluminum hydrous oxide slurry with a magnesium oxide slurry and a sodium hydroxide solution, calcining, impregnating with solutions of cerium and/or vanadium and calcining at a temperature of 450° to 700° C.

Sulfur oxide emissions from fluid catalytic cracking units, for example, are increasingly restricted by environmental regulations. The removal of sulfur oxide pollutants has been the subject of considerable attention for several years. One approach to reducing such emissions involves desulfurizing a hydrocarbon feed stream before it enters the cracking unit, so that a lesser amount of sulfur oxides are produced. Another approach is to scrub the emissions stream with an inexpensive alkaline material, such as lime or limestone. However, both of these approaches are relatively cumbersome and they create other waste disposal problems. Accordingly, separating the sulfur oxides by contact with a reusable absorbent presents an appealing alternative.

The sulfur oxide absorbents which reportedly have received the widest commercial acceptance to date in fluidized catalytic cracking units are based on spinel technology, most notably $MgAl_2O_4$ spinels combined with cerium oxide. Although the spinel and cerium absorbents are adequate for many purposes, they exhibit limited absorbent capacity and are prone to deactivation. In particular, free cerium oxide crystals present in the spinel and cerium absorbents tend to increase in size during normal operation so as to inhibit overall activity. Additionally, the spinel and cerium absorbents require more time for complete desorption than is available in some cyclic processing schemes.

U.S. Pat. No. 5,426,083 issued to Bhattacharrya et al. and assigned to the assignee of the present invention describes an absorbent and process for removing sulfur oxides from a gaseous mixture, as well as processes for manufacturing the absorbent. The manufacturing processes described in the '083 Patent significantly advance the art and are entirely satisfactory for many purposes. However, the manufacturing processes recite blending divalent and trivalent metal salts as reagents. U.S. Pat. No. 5,426,083 issued to Bhattacharrya et al. is hereby incorporated by reference in its entirety, and particularly for its teachings regarding the preparation, use, calcination, and collapse of layered anionic mixed hydroxide compositions.

A salt is defined for the present purposes as any substance which spontaneously yields ions, other than hydronium or hydroxide ions, when immersed in water. Typically, salts are obtained by displacing the hydrogen of an acid by a metal. According to the definition, metal oxides, metal oxide hydroxides and metal hydroxides are not salts because these compounds spontaneously yield essentially no ions or, alternatively, yield hydroxide ions when immersed in water. Examples of salts under this definition are metal nitrates, metal chlorides, metal acetates, and metal carbonates.

Metal salts, both divalent and trivalent, are known to give rise to byproducts, such as nitrates, which are regarded as objectionable contaminants in some applications. Such byproducts have long been regarded as unavoidable, as previous practitioners apparently believed that aqueous dissociated metal salts were required to form the well ordered sheets characteristic of high quality clays. As a result, conventional processes for manufacturing layered mixed double hydroxide compositions often include tedious filtration and water washing steps to remove the byproducts. A process for preparing superior absorbents which does not include metal salts as reagents would be welcomed by practitioners who object to the presence of byproducts but who also wish to minimize or dispense with filtration and water washing for byproduct removal.

SUMMARY OF THE INVENTION

The invention is a process for manufacturing an improved absorbent composition composed substantially of relatively small microcrystallites which demonstrate desirable sulfur oxide absorption capacity, comparatively fast sulfur oxide absorption and desorption rates, and catalytic activity for the chemical conversion of a nitrogen oxide to nitrogen. High resolution electron microscopy reveals that a substantial portion of the microcrystallites are essentially composed of a solid solution having impurities, such as aluminum oxide, dispersed in a monoxide of a divalent metal. The improved absorbent also includes spinel microcrystallites and trivalent metal oxide microcrystallites. The manufacturing process utilizes reagents which contain a relatively minor amount of metal salts or, preferably, contain essentially no metal salts.

The invention is a process for manufacturing an anionic layered mixed hydroxide composition having the formula:

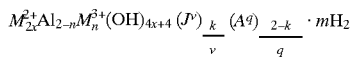
$$M^{2+}_{2x}Al_{2-n}M^{3+}_{n}(OH)_{4x+4}\underbrace{(J^{\nu})_{k}}_{v}\underbrace{(A^{q})_{2-k}}_{q}\cdot mH_2$$

where $M^{2+}$ is a divalent metal selected from the group consisting of magnesium, calcium, zinc, barium, and strontium. $M^{3+}$ is a trivalent metal cation selected from the group consisting of cerium, lanthanum, iron, chromium, vanadium, and cobalt.

J is $VO_3$, $HVO_4$, $VO_4$, $V_2O_7$, $HV2O_7$, $V_3O_9$, $V_4O_{12}$, $WO_4$ or $MoO_4$. A is selected from the group consisting of $CO_3$, OH, $SO_3$, $SO_4$, Cl, and $NO_3$. q and v are the net ionic charges associated with J and A, respectively. x is about 1.1 to about 3.5, while n is about 0.01 to about 0.4, m is a positive number.

The invention is also a process for manufacturing a composition suitable for use as a sulfur oxide absorbent. The absorbent comprises microcrystallites collectively of the formula:

$$M^{2+}_{2m} Al_{2-p} M^{3+}_{p} T_r O_{7+r\cdot s}$$

where $M^{2+}$ is a divalent metal, and $M^{3+}$ is a trivalent metal, as described above. T is vanadium, tungsten or molybdenum. p is about 0.01 to about 0.4, while r is about 0.01 to about 0.2. s is 2.5 when T is vanadium or 3 when T is tungsten or molybdenum. Each of the microcrystallites has a greatest linear dimension in the range of about 0.1 to about 30 nanometers. Moreover, a substantial portion of the microcrystallites of the invention are essentially composed of a solid solution phase having impurities, such as aluminum oxide or vanadium oxide, dispersed in a monoxide of the divalent metal. Another portion of microcrystallites are essentially composed of a spinel phase.

In one aspect of the manufacturing process, water is blended with about two molar parts of a divalent metal compound which is not a salt and includes a divalent metal selected from the group consisting of magnesium, calcium, zinc, strontium, and barium. Additionally, one molar part in sum of an aluminum compound which is not a salt and a selected trivalent metal compound which is not a salt is also blended in the mixture. The trivalent metal compound contains a trivalent metal selected from the group consisting of cerium, lanthanum, iron, chromium, vanadium and cobalt. A metalate salt in a quantity of about 0.01 to less than 2 molar parts is also blended into the mixture to act as a precursor for the above-described interstitial anions. Alternatively, about one-half to about one molar part of a water soluble interstitial anion precursor such as sodium carbonate may be blended into the mixture to serve as a source of temporary intersititial anions, which are later eradicated by cacining and at least partially replaced by anions from a metalate salt.

The metalate salt contains an anionic species which is a vanadate, a tungstate, or a molybdate. In an especially preferred aspect, an alkalinity control agent is also blended into the mixture to stabilize the anion in an aqueous, dissociated form which contains but a single metal atom. Anions in such form are commonly described as monometalate. It is sometimes convenient to introduce the anions in solution form as a separate step after a precipitate has formed and has been calcined at least once.

The mixture is heated to a temperature in the range of about 50° to about 100° C. for at least about one hour and, thereafter, an anionic layered mixed hydroxide is recovered from the mixture. The recovered layered hydroxide is calcined for about one hour at a temperature of about 450° C. or hotter to produce a partially collapsed and dehydrated composition suitable for use as a sulfur oxide absorbent or as a nitrogen oxide reductant. Metalate anions may be introduced via an metalate salt solution at this point to replace at least partially replace any interstitial anions which have been eradicated by the calcining, after which introduction the calcining is preferably repeated. The collapsed composition is substantially composed of microcrystallites having a greatest linear dimension in the range of 0.1 to about 30 nanometers. The collapsed composition contains microcrystallites which are essentially composed of a solid solution phase having aluminum oxide or vanadium oxide dispersed in a monoxide of the divalent metal. The collapsed composition also contains microcrystallites which are essentially composed of a spinel phase.

In another aspect, the invention is a process for manufacturing a composition suitable for use as a sulfur oxide absorbent which comprises calcining a layered mixed hydroxide at a temperature of at least about 450° C. for about one hour or more. The layered hydroxide is prepared from a divalent compound, an aluminum compound, and a trivalent compound which do not include a salt, and one or more interstitial anion precursors, as described above. The layered mixed hydroxide is of the formula set forth above in regard to layered mixed hydroxides of the invention. The product of calcining is a collapsed composition substantially composed of microcrystallites, each of about 0.1 to about 30 nanometers in size. The microcrystallites are constituted by solid solution phase microcrystallites and by spinel phase microcrystallites, as described above.

DETAILED DESCRIPTION OF THE INVENTION

Figure 1:
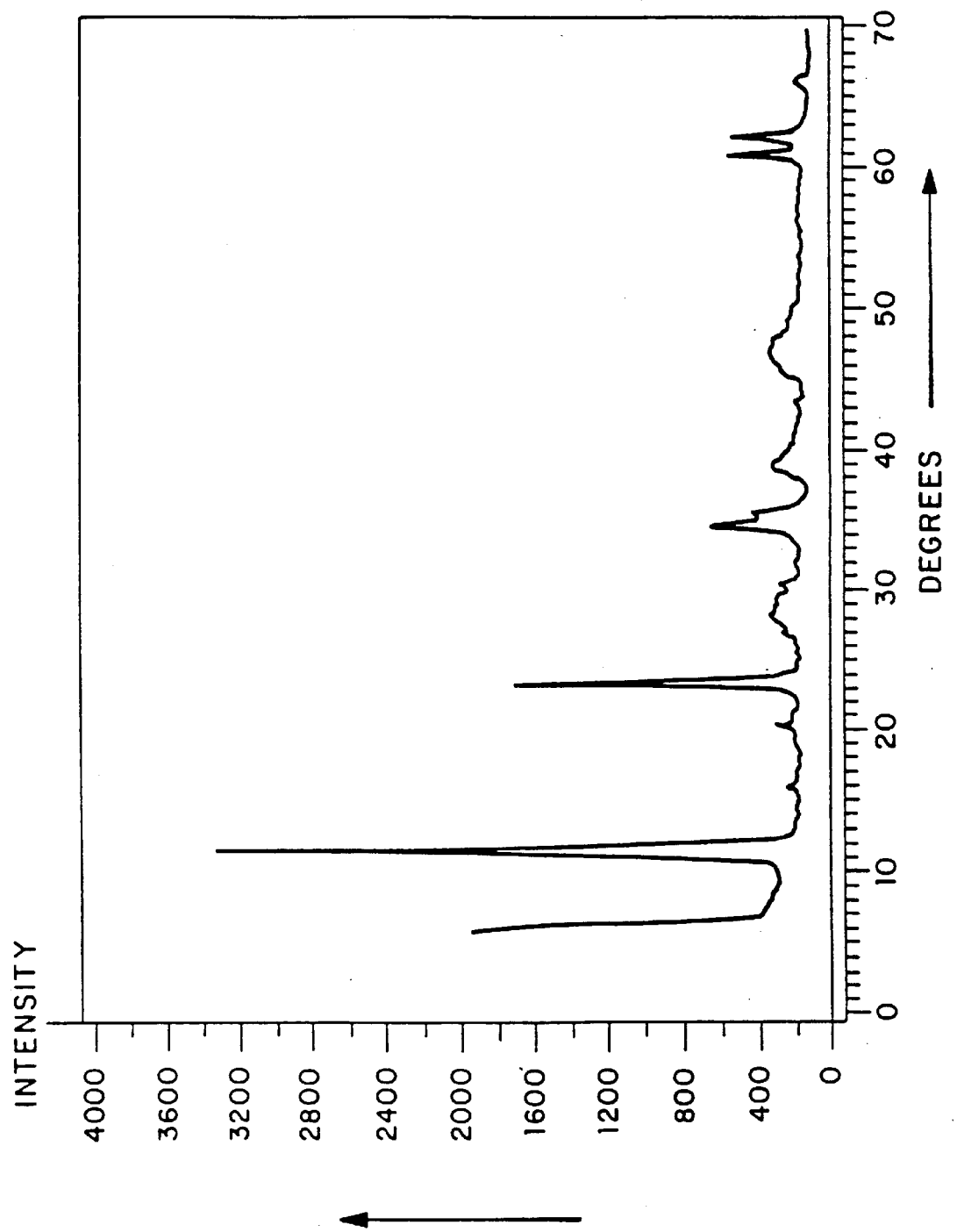
FIG. 1 is the trace of an x-ray diffraction analysis for the product of Example 1, showing a relationship between intensity and an angle (in degrees) that is characteristic of a mixed layered hydroxide structure having a d(001) value of 7.62 Angstroms units.

The invention is an improved process for manufacturing anionic layered mixed hydroxide compositions which can be calcined to produce dehydrated and collapsed compositions having unique solid solution microcrystallites that are very suitable for use as sulfur oxide absorbents. Surprisingly, the reagents for the manufacturing process need not include salts, other than those salts which serve as interstitial anion precursors. It has now been discovered that metal oxides and metal hydroxides can serve as suitable cation precursors for layered mixed double hydroxide compositions. The layered compositions will be described first.

Anionic layered mixed hydroxide compositions are layered in the sense that they are constituted by sheets of divalent and trivalent metal cations interposed between a larger number of hydroxide anions which are also in the sheets. They are mixed because divalent cations and trivalent cations are interspersed within the sheets. Water molecules and interstitial anions are located in interlayers between the sheets. When subjected to conventional x-ray diffraction analysis, the layered mixed hydroxide composition exhibits diffraction peaks whose positions can be correlated with the average distance between adjacent sheets.

In one aspect, the invention is an anionic layered mixed hydroxide composition of the formula:

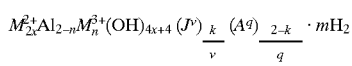

In the formula, $M^{2+}$ is a divalent metal present as a cation having a valence of positive two which is coordinated with a plurality of hydroxide anions to form infinite sheets. The structure of the sheets resembles the structure of the naturally occurring mineral brucite, $Mg(OH)_2$. The divalent metal is preferably selected from the elements of Group IIA or IIB of the periodic table of the elements as depicted on the inside front cover of *Perry's Chemical Engineers Handbook* (6th Edition). More preferably, the divalent metal is selected from the group consisting of magnesium, calcium, zinc, strontium, and barium; most preferably from the group consisting of magnesium, calcium, and zinc.

The symbol $M^{3+}$ denotes a trivalent metal present as a cation of valence three. The trivalent metal is preferably selected from the group consisting of rare earth elements, iron, chromium, vanadium, and cobalt. More preferably, the trivalent metal is selected from the group consisting of cerium, lanthanum, iron, chromium, vanadium, and cobalt; most preferably cerium and lanthanum. The rare earth elements, also known as the lanthanide series elements, are often found as a naturally occurring mixture of two or more of the rare earth elements. It is contemplated that such mixtures of rare earth elements may be conveniently employed in the present invention.

x is about 1.1 to about 3.5; preferably about 1.5 to about 3.5; and more preferably about 2 to about 3. n is about 0.01 to about 0.4, more preferably about 0.2 to about 0.4. Al is the trivalent metal aluminum present as a trivalent cation coordinated with a plurality of hydroxide anions. Additionally, it is preferred that the molar ratio of the divalent metal to aluminum be about 1 to about 5, more preferably about 2 to about 3.

J is an anion selected from the group consisting of vanadates, tungstates and molybdates. Preferably, J is $VO_3$, $HVO_4$, $VO_4$, $V_2O_7$, $HV_2O_7$, $V_3O_9$, $V_4O_{12}$, $WO_4$ or $MoO_4$. More preferably, J is selected from the group consisting of monovanadates, specifically metavanadate ($VO_3$), orthovanadate, ($VO_4$) and partially protonated vanadate ($HVO_4$). Preferably, J is located primarily in interlayers between the sheets. v is the net anionic charge associated with $VO_3^{1-}$ is −1. Similarly, the net ionic charge associated with $HVO_4^{2-}$ is −2.

A is a relatively small anion having a size approximately equal to that of carbonate ($CO_3$). Preferably, A is selected from a group consisting of $CO_3$, OH, $SO_3$, $SO_4$, Cl, and $NO_3$. q is the net ionic charge associated with A, preferably negative one or negative two. k is about 0.01 to less than 2.

m is a positive number quantitatively indicating the presence of water molecules. Preferably, substantially all of the water molecules are located in the interlayer. However, the formula presented is empirical and is not limited to any particular structure.

By way of comparison, the naturally occurring mineral hydrotalcite is a specific example of an anionic layered mixed hydroxide composition. However, the formula of hydrotalcite differs from the formula of the layered composition of the present invention in that the mineral hydrotalcite ordinarily contains substantially no divalent metals other than magnesium, substantially no trivalent metals other than aluminum, and substantially no anions other than carbonate.

The layered composition of the present invention exhibits an x-ray diffraction pattern when analyzed using conventional techniques, preferably an x-ray diffraction pattern including a d(001) value equal to or greater than about 7.6 Angstrom units. An especially preferred layered composition employs magnesium as the divalent metal, cerium as the trivalent metal, and a monovanadate as the anion J.

In another aspect, the invention is a dehydrated and at least partially collapsed composition suitable for use as a sulfur oxide removal catalyst. Preferably, the collapsed composition is prepared by heat treating the layered composition described above. Regardless of its source or method of preparation, the collapsed composition comprises microcrystallites which are collectively of the formula:

In the formula, $M^{2+}$ is a divalent metal, Al is aluminum and $M^{3+}$ is a trivalent metal, as described above. T is vanadium, tungsten or molybdenum, preferably vanadium.

m is preferably about 1.1 to about 3.5, more preferably about 1.5 to about 3.5, and most preferably about 2 to about 3. p is about 0.01 to about 0.4, preferably about 0.2 to about 0.4. It is preferred that the molar ratio of the divalent metal to aluminum be about 1 to about 5, more preferably about 2 to about 3.

r is about 0.01 to about 0.2, preferably about 0.05 to 0.2. In the algebraic expression communicating the subscript for O in the above formula, r is multiplied times s. s is 2.5 when T is vanadium, but s is 3 when T is tungsten or molybdenum.

Each of the microcrystallites of the invention has certain identifying characteristics. It is not necessary that every microcrystallite present in a composition possess these characteristics, but a substantial proportion of the microcrystallites must possess the characteristics in order to achieve the advantages offered by the invention.

First, the microcrystallites of the invention have a greatest linear dimension in the range of about 0.1 to about 30 nanometers, more preferably about 1 to about 20 nanometers and most preferably about 10 nanometers. The microcrystallites need not be spherical. For microcrystallites which are spherical, the greatest linear dimensions are the diameters.

Absorbents having microcrystallites with dimensions in the specified range are sometimes term "amorphous," possibly because conventional x-ray diffraction analysis techniques are inadequate to detect the presence of their relatively small crystal structure. However, high resolution electron microscopy routinely detects microcrystallites in this size range. For the present purposes, high resolution electron microscopy is defined as electron microscopy capable of a point-to-point resolution of at least about 2.0 Angstrom units.

Such electron microscopy is also capable of detecting lattice planes in microcrystallites. A lattice plane is a regular geometrical arrangement of objects in space, such as atoms arranged in a crystalline structure, that is relatively flat in a given vicinity. When viewed on edge by appropriate electron microscopy techniques, the lattice planes appear as lines which can be curved or straight as well as continuous or discontinuous.

Additionally, the electron microscopy techniques can pinpoint the existence and location of individual lattice planes, the relative intensity of various lattice planes, and the spacing between adjacent lattice planes. Taken together, these observations of the crystal lattice, termed "lattice parameters," can be used to distinguish between two or more phases within a high resolution electron microscopes field of view. Herein, a phase is understood to be a homogeneous, physically distinct portion of matter present in a non-homogeneous physical-chemical system.

In practice, the lattice planes exhibit identifying lattice parameters, such as spacing, relative intensity, and periodic repetitions in spacing and intensity, which can be utilized to distinguish between phases. Once the presence of distinguishable phases has been determined, it may be necessary to carry out other types of analyses in order to precisely determine compositions of the phases. For example, scanning electron microscopy is often used to confirm the phase compositions.

Secondly, a substantial portion of the microcrystallites of the present invention are essentially composed of a solid solution phase in which an impurity, such as aluminum oxide ($Al_2O_3$) or vanadium oxide, is dispersed within a crystal lattice of a monoxide of a divalent metal, such as magnesium oxide (MgO). The dispersion is not merely a physical aggregation. Rather, the impurity is present as a dopant. The impurities are located so as to expand the crystal lattice of the divalent metal monoxide but not to disrupt the crystal lattice completely.

Another portion of the microcrystallites is composed essentially of a spinel phase. For example, the spinel phase may include a magnesium spinel such as $MgAl_2O_4$. Additionally, microcrystallites composed essentially of an oxide of the trivalent metal are preferably present.

The solution solid phase having aluminum oxide dispersed in a divalent monoxide crystalline structure is considered to be highly unusual. It is much more common to find relatively separate microcrystallites of aluminum oxide and the divalent monoxide together, with each microcrystallite containing but a single oxide. Accordingly, it is hypothesized that the presence of the solid solution phase of the present invention indicates a tendency to resist further division between the two phases. It is believed that the presence of the solid solution phase correlates with improved stability and activity under hydrocarbon processing conditions.

The divalent metal oxide phase can be selected from the Group IIA and Group IIB elements. Preferably the divalent metal is selected from the group consisting of magnesium, calcium, zinc, strontium, and barium, more preferably from the group consisting of magnesium, calcium and zinc. It is especially preferred that the divalent metal oxide phase be composed essentially of magnesium oxide.

The spinel phase is constituted by elements in crystalline spinel form, although the spinel may be present as microcrystallites too small to be detected by conventional x-ray diffraction analyses. The spinel structure is based on a cubic close packed array of oxide ions. Typically, the crystalline unit cell of the spinel structure contains 32 oxygen atoms. With regard to magnesium aluminum oxide spinel, there are 8 magnesium atoms and 16 aluminum atoms in each unit cell, corresponding to the formula $MgAl_2O_4$.

If oxide crystals of the trivalent metal described above are present, such as crystals of cerium oxide or lanthanum oxide, the trivalent metal oxide crystals each must be substantially in the form of microcrystallites having a greatest linear dimension in the range of about 0.1 to about 30 nanometers, preferably about 1 to about 20 nanometers. It is especially preferred that the trivalent metal be predominantly situated in relatively homogeneous microcrystallites of the present invention coexisting with solid solution microcrystallites and spinel microcrystallites.

It is hypothesized that the presence of the trivalent metal oxide phase with the other microcrystallites of the present invention provides a desirable degree of dispersion for the trivalent metal atoms and also tends to protect trivalent metal oxides molecules from attrition. Cerium oxide crystals standing alone, for example, have a tendency to disintegrate under the stresses of fluidized bed processing.

In yet another aspect, the invention is a process for manufacturing a composition suitable for use as a sulfur dioxide absorbent. A mixture is produced by blending water with about two parts by moles of a divalent metal compound which is not a salt and which includes a divalent metal selected from the group consisting of magnesium, calcium, zinc, strontium, and barium; preferably magnesium. Additionally, about one part by moles of the combined sum of an aluminum compound which is not a salt and a trivalent metal compound which is not a salt and which includes a trivalent metal selected from the group consisting of cerium, lanthanum, iron, chromium, vanadium and cobalt is blended into the mixture. The sum is calculated by adding the molar amount of the aluminum compound to the molar amount of the trivalent metal compound and dividing the total by one-half of the molar amount of the divalent metal compound.

Also blended in the mixture is a water soluble interstitial anion precursor which is essentially eradicated by later calcining such as, for example, an interstitial anion precursor selected from the group consisting of carbonates, hydroxides, sulfites, sulfates, chlorides, and nitrates. In this case, the interstitial anion precursor should be blended in an amount sufficient to give rise to of about one-half to about one, preferably about one-half to about three-quarters, and most preferably about one-half molar part of a molar part of an anion in the mixture. Alternatively, an interstitial anion precursor composed essentially of one or more metalate salts, which are capable of withstanding calcining at temperatures in the range of about 450 to about 1000 degrees C., may be blended to produce the mixture. In this alternative case, about 0.01 to less than 2 molar parts of the metalate salt is blended. The metalate salt of the present invention contains an anion which is a vanadate, a tungstenate or a molybdenate.

A salt is defined for the present purposes as any substance which spontaneously yields ions, other than hydronium or hydroxide ions, when immersed in water. Typically, salts are obtained by displacing the hydrogen of an acid by a metal. According to the definition, metal oxides, metal oxide hydroxides and metal hydroxides are not salts because these compounds spontaneously yield essentially no ions or, alternatively, yield hydroxide ions when immersed in water. Examples of salts under this definition are metal nitrates, metal chlorides, metal acetates, and metal carbonates.

In a preferred aspect, the process also includes blending into the mixture an appropriate amount of an alkalinity control agent to stabilize the anions in an aqueous, disassociated metalate form selected from the group consisting of monometalate, dimetalate, trimetalate, and tetrametalate anions. In an especially preferred aspect, the anions are monometalates which each contain exactly one metal atom. For example, $VO_3^{1-}$, $HVO_4^{-2}$, and $VO_4^{3-}$ represent anions which each contain exactly one metal atom. Allowance must often be made for losses of the alkalinity agent to precipitation. Stabilization of the metalate anion typically takes place in a liquid phase portion of the blended mixture.

For the present purposes, blending is understood to include methods wherein all of the described ingredients are blended simultaneously, and also to include methods wherein two or more of the ingredients are blended with each other and then blended with other ingredients. At each successive combination of ingredients. At each successive combination of ingredients, care must be taken to provide concentrations and alkalinities which tend to precipitate desired divalent metals and trivalent metals, as described above. The alkalinity of the mixture can also determine which forms of the anions are stabilized in solution and ultimately become components of the precipitates. It is often convenient to delay addition of the metalate anions until after a precipitate has formed and has been subjected to recovery and calcining.

The final choice of blending amounts and conditions is guided by the knowledge of previous practitioners in the art. For example, U.S. Pat. No. 5,246,899 and U.S. Pat. No. 5,354,932, which are herein incorporated in their entirety, contain useful teaching regarding pH-dependent anions and intercalating agents. Additionally, pages 181 through 182 of "The Early Transition Metals," by D. L. Kepert, Academic Press (New York) are recommended for information on stabilizing vanadate ions in solution.

In an especially preferred aspect of the process, the metalate salt contains a vanadate and is blended in an amount sufficient to produce a concentration of the vanadate in a liquid phase of the mixture which is in the range of about 0.01 to about 1 molar. Additionally, sufficient alkalinity control agent resides in the liquid phase of the mixture to produce an alkalinity in the range of about 6 to about 14 pH. The range of about 6 to about 8 pH is appropriate for $VO_3^{1-}$. The range of about 9 to 13 pH is appropriate for $HVO_4^{2-}$. The range of about 13 to about 14 is appropriate for $VO_4^{3-}$.

In this especially preferred aspect of the process, it is contemplated that about 50 percent or more of the vanadate ions dissolved in the liquid portion of the mixture are in a monometalate vanadate form, such as $HVO_4^{2-}$, $VO_4^{3-}$ or $VO_{3-}$. Because the metavanadate anion ($VO_3^{1-}$) and the orthovanadate anion ($VO_4^{3-}$) are stabilized at conditions which are inconsistent with the precipitation of many divalent metal hydroxides and trivalent metal hydroxides, it is often convenient to blend solutions containing these anions with the product of the recovery and the first calcination described above. Preferably, the product is calcined again after being exposed to the metalate salt solution.

The heated mixture is permitted to stand for at least about 1 hour, preferably at a temperature in the range of about 50° to about 100° C., more preferably about 75° to 100° C. Higher temperatures may be utilized provided that commensurately higher pressures exist to maintain at least a portion of the mixture in the liquid phase. An anionic layered mixed hydroxide, as described above, is recovered as a solid from the mixture. Appropriate recovery techniques include but are not limited to filtration, evaporation, fractional crystallization and spray drying. The anionic layered mixed hydroxide so recovered may or may not contain interstitial metalate anions, depending primarily on whether metalate anions were present in the interstitial anion precursor blended to produce the mixture, as described above. However, the product of the improved manufacturing process is remarkably free of byproducts. Therefore, it is especially preferred that the anionic layered mixed hydroxide is recovered without filtration or water washing. Mere evaporation or spray drying often produces a product of acceptable purity.

The recovered layered mixed hydroxide is calcined for not less than about 1 hour at a temperature of about 450° C. or hotter. Preferably the temperature is in the range of about 450° to about 1000° C., more preferably about 450° to about 850° C. These calcining conditions are sufficiently severe to eradicate water and many interstitial anions from the recovered material, but generally will not drive off metalate anions if they are present as interstitial anions. For example, it is contemplated that such calcining will produce a product that is essentially devoid of anions such $CO_3^{2-}$, $OH^-$, $SO_3^{2-}$, $SO_4^{2-}$, $Cl^-$ and $NO_3^-$. The recovered material may be calcined more than once, preferably before and after one or more exposures to a metalate salt solution as described above.

A very significant advantage can be enjoyed at this stage if the interstitial anions being eradicated by calcining are $CO_3^{2-}$ anions, particularly if such carbonate anions are introduced to the mixture via sodium carbonate as the interstitial anion precursor. In that case, calcination off-gas produced as a byproduct of the anion eradication contains carbon dioxide rather than, for example, sulfuric acid or hydrogen chloride. Because the off-gas associated with sodium carbonate is relatively harmless to humans and the environment, sodium carbonate is the interstitial anion precursor of choice when interstitial anions which are essentially eradicated by calcining are desired.

Herein, calcining refers to the heating of a solid in the presence of a gas, preferably a flowing gas. The gas may be air or, alternatively, a relatively inert gas, such as nitrogen, helium, or carbon dioxide. As noted above, The final calcining produces a dehydrated and collapsed composition suitable for use, for example, as a sulfur oxide absorbent.

The collapsed composition is dehydrated in the sense that it contains essentially no associated water molecules. Additionally, the sheets containing metal cations coordinated with hydroxide anions, as described above, are at least partially disrupted by the calcining and are in a condition conveniently termed "collapsed." Rather than having sheets of 400 nanometers or more in length as are typical of the layered mixed hydroxides, the collapsed composition is substantially composed of microcrystallites, each having a greatest linear dimension in the range of about 0.1 to about 30 nanometers. It is hypothesized that the microcrystallites are disintegrated and jumbled remnants of the layered mixed hydroxides which are believed to have at least partially collapsed when subjected to the calcining. Repeated calcination steps interspersed by contact with aqueous solutions are believed to repeatedly disrupt and reform the layered sheets so as to produce a final collapsed product having an excellent degree of microcrystallite dispersion.

In any event, the microcrystallites of the invention are relatively small and well dispersed so as to be accessible to reactants such as sulfur oxides. A substantial portion of the microcrystallites are constituted by a solid solution phase having aluminum oxide dispersed in a divalent metal monoxide. Another portion is constituted by a spinel phase. The phases contain lattice planes discernible by high resolution electron microscopy.

In yet another aspect the invention is a process for manufacturing a composition suitable for use as a sulfur oxide absorbent which comprises calcining a layered mixed hydroxide prepared without divalent or trivalent metal salt reagents, as described above. The composition is of the formula:

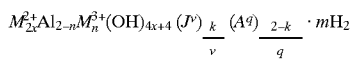

$M^{2+}$ is a divalent metal selected from the group consisting of magnesium, calcium, zinc, barium, and strontium. Divalent metals selected from the group consisting of magnesium, calcium, and zinc are preferable because in practice they more readily form sheets of metal cations coordinated with hydroxide anions, as described above. Magnesium is especially preferred as the divalent metal.

x is about 1.1 to about 3.5, preferably 1.5 to 3.5; n is about 0.01 to about 0.4, preferably about 0.1 to about 0.3. The trivalent metal, $M^{3+}$, is selected from the group consisting of cerium, lanthanum, iron, chromium, vanadium and cobalt, preferably the trivalent metal is cerium, lanthanum or iron.

J is a monomeric anion selected from the group consisting of $VO_3$, $HVO_4$, $VO_4$, $V_2O_7$, $HV_2O_7$, $V_3O_9$, $V_4O_{12}$, $WO_4$, and $MoO_4$; v is the net ionic charge associated with 3; and k is about 0.01 to less than 2.

A is $CO_3$, OH, $SO_3$, $SO_4$, Cl, or $NO_3$; q is the net ionic charge associated with A; and m is a positive number.

The calcining is performed for about one hour or more at a temperature of at least about 450° C., preferably a temperature in the range of about 450° to about 1000°, and more preferably a temperature in the range of about 450° to about 850° C. The calcining may be performed repeatedly, in two or more operations preferably interspersed by contacting with an aqueous metalate salt solution. The final calcining produces a dehydrated and collapsed composition, as described above.

In still another aspect, the invention is a process for separating sulfur oxides from a gas containing sulfur oxides which comprises absorbing sulfur oxides by exposing a gaseous mixture containing sulfur oxides to a dehydrated and collapsed composition, as described above. Herein the term "absorbing" is understood to include absorption, adsorption, imbibition, and chemisorption. The sulfur oxides include sulfur dioxide and sulfur trioxide. The absorbing causes the sulfur oxide to become associated with and remain in close proximity to the collapsed composition. It is not entirely clear whether the sulfur oxides are associated in the form of sulfur trioxide molecules, an anion containing sulfur and oxide, or some other chemical species.

The gaseous mixture from which sulfur oxides are removed need not contain molecular oxygen, but in a preferred aspect of the invention desirably contains an amount of molecular oxygen which is at least one half of, and which is more preferably in excess of the stoichiometric amount required to convert any sulfur dioxide present to sulfur trioxide. The excess of molecular oxygen need not be large, but the ability of the absorbent of this invention to absorb sulfur dioxide is improved as the amount of excess molecular oxygen increases. Although the reason for this effect by molecular oxygen is uncertain, it is believed that increased concentrations of oxygen promote the conversion of sulfur dioxide to sulfur trioxide and assist in rejuvenating an oxidation function of the adsorbent. It is also believed that this sulfur trioxide is more easily absorbed by the absorbent than is the sulfur dioxide.

Preferably, the molar percentage of molecular oxygen in the gaseous mixture containing sulfur oxides, based on the total moles of gas present, is about 0.1 to about 5 mole percent more preferably about 1 to about 3 mole percent, and most preferably about 2 mole percent. The molecular oxygen can either be inherently present in the sulfur oxide containing gaseous mixture or can be added. The absorption of sulfur oxides is desirably carried out at a temperature of about 100° to about 900° C., preferably at a temperature of about 300° to about 900° C. and most preferably at a temperature of about 450° to about 800° C.

The sulfur oxides are desorbed by contacting the collapsed composition with a hydrocarbon in the presence of a cracking catalyst at an elevated temperature. The temperature is desirably about 375° to about 900° C., preferably about 430° to about 700° C., and most preferably about 450° to about 650° C. Any hydrocarbon can be used to remove the absorbed sulfur oxides from he absorbent of this invention so long as it can be cracked by the cracking catalyst at the temperatures employed. Suitable hydrocarbons include, but are not limited to methane, natural gas, natural gas liquids, naphtha, light gas oils, heavy gas oils, wide-cut gas oils, vacuum gas oils, decanted oils, and reduced crude oils as well as hydrocarbon fractions derived from shale oils, coal liquefaction and the like; such hydrocarbons can be employed either singly or in any desired combination. Additionally, the sulfur oxides can be desorbed by contact with a reducing gas such as hydrogen.

Although the invention disclosed herein is not to be so limited, it is hypothesized that a chemical reaction occurs between the collapsed composition and the sulfur oxides which results in the formation of non-volatile inorganic sulfur compounds, such as sulfites and sulfates, at relatively high temperatures. These sulfites and sulfates can undergo partial decomposition to liberate the original sulfur oxides and collapsed composition. As a consequence of this reversal of the sulfur oxide absorption at high temperature, the absorption of sulfur oxides is desirably effected at a temperature below about 900° C. and preferably below about 800° C.

The precise mechanism by which absorbed sulfur oxides are removed from the collapsed composition is unknown, but it is believed that the combination of hydrocarbons and hydrocarbon cracking catalyst and elevated temperatures produces a reducing environment which effects a conversion of absorbed sulfur oxides to hydrogen sulfide while simultaneously reactivating the collapsed composition for further absorption of sulfur oxides. The removal of absorbed sulfur oxides from the collapsed composition is generally improved by contacting the collapsed composition with added steam either simultaneously with or subsequent to treatment with a hydrocarbon in the presence of a cracking catalyst.

The hydrogen sulfide which is produced during the removal of absorbed sulfur oxides from the collapsed composition can be converted to elemental sulfur by any of the conventional techniques which are well-known to the art as, for example, in a Claus Unit. Cracked hydrocarbon products which are produced during removal of absorbed sulfur oxides can be recycled for further use in removing absorbed sulfur oxides.

It is highly preferable that the process for separating sulfur oxides further comprise exposing a layered mixed hydroxide of the formula:

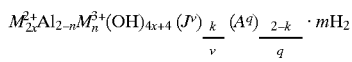

where $M^{2+}$ is a divalent metal selected from the group consisting of magnesium, calcium, and zinc;

x is about 1.1 to about 3.5;

n is about 0.01 to about 0.4;

$M^{3+}$ is a trivalent metal selected from the group consisting of cerium, iron, chromium, vanadium and cobalt;

J is $VO_3$, $HVO_4$, $V_2O_7$, $HV_2O_7$, $V_3O_9$, $V_4O_{12}$, $VO_4$, $WO_4$ or $MoO_4$;

v is the net ionic charge associated with J;

k is about 0.01 to less than 2;

A is selected from the group consisting of $CO_3$, OH, $SO_3$, $SO_4$, Cl, $NO_3$;

q is the net ionic charge associated with A; and m is a positive number, to the gaseous mixture containing sulfur oxides at a temperature in the range of about 450° to about 1000° C. to produce the collapsed composition described above.

Suitable cracking catalyst for use in the practice of this invention includes all high activity solid catalysts which are stable under the required conditions. Suitable catalysts include those of the amorphous silica-alumina type, having an alumina content of about 10 to about 30 weight percent. Catalysts of the silica magnesia type are also suitable which have a magnesia content of about 20 weight percent. Preferred catalysts include those of the zeolite-type which comprise from about 0.5 to about 50 weight percent and preferably about 1 to about 30 weight percent of a crystalline alumina silicate compound distributed through a porous matrix. Zeolite-type cracking catalysts are preferred because of their thermal stability and high catalytic activity.

The crystalline alumina silicate or zeolite component of the zeolite-type cracking catalyst can be of any type or combination of types, natural or synthetic, which is known to be useful in catalyzing the cracking of hydrocarbons. Suitable zeolites with various silica to alumina ratios include both naturally occurring and synthetic alumina silicate materials such as faujasite, chabazite, mordenite, Zeolite X, Zeolite Y, Zeolite beta, ZSM-5 and ultra-stable large pore zeolites. The zeolite-type cracking catalyst may be dispersed within a porous refractory material, natural or synthetic, which can be, for example, silica, alumina magnesia, boria, kieselguhr, diatomaceous earth, and mullite.

In the practice of this invention, the collapsed composition can be incorporated into or deposited onto a suitable support. Suitable supports include, but are not limited to, amorphous cracking catalyst, zeolite-type cracking catalyst, silica, alumina, mixtures of silica and alumina, magnesia, mixtures of silica and magnesia, kieselguhr, kaolin, and diatomaceous earth. Preferably the support is porous and has a surface area including the area of the pores open to the surface of at least about 10, preferably at least about 50, and most preferably about 100 square meters per gram.

The following Examples are not intended to limit the scope of the invention in any manner but, rather, are presented in order to better communicate certain aspects of the invention.

EXAMPLE 1

Preparation of a Layered Mixed Hydroxide from Divalent and Trivalent Metal Salts One liter of deionized water, 15.90 grams (0.15 mol) of sodium carbonate, and 48.0 grams (1.2 mol) of sodium hydroxide were charged to a flask equipped with a mechanical stirrer and a water-cooled reflux condenser. One liter of deionized water, 102.56 grams (0.4 mol) of $Mg(NO_3)_2 \cdot 6H_2O$, 67.38 grams (0.1796 mol) of $Al(NO_3)_3 \cdot 9H_2O$, and 8.86 grams (0.0204) of $Ce(NO_3)_3 \cdot 6H_2O$ were blended and added dropwise to the flask with continuous stirring over a period of about one hour. The result was a gelatinous mixture of 10.74 pH which was heated under reflux while being swept with a nitrogen purge for about 15 hours at 85° C. The mixture was subsequently cooled, filtered, washed repeatedly with deionized water, and dried overnight under vacuum at 70°. The dried material was designated Sample A.

Sample A was analyzed by conventional x-ray diffraction techniques which produced the trace presented in FIG. 1. The trace includes peaks characteristic of a hydrotalcite structure having a d(001) value of 7.62 Angstrom units. Additionally, Sample A was analyzed for metals by inductively coupled plasma techniques and the metals were reported as 20.6 percent magnesium, 12.0 percent aluminum, 6.1 cerium, and 450 ppm sodium. The reported metals correspond to a hydrotalcite clay having the formula:

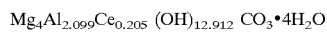

EXAMPLE 2

Calcination of a Layered Mixed Hydroxide at 450°

A portion of the dried material produced by the procedure described in Example 1 above was heated in air at a rate of about 20° C. per minute until a temperature of 450° C. was achieved. The material was held at 4500 for 15 hours and then cooled. The material calcined at 450° was designated Sample B.

EXAMPLE 3

Calcination of a Layered Mixed Hydroxide at 850°

A portion of the dried material produced by the procedure described in Example 1 above was heated in air at a rate of about 20° C. per minute until a temperature of 850° was achieved. The material was held at 850° for 15 hours and then cooled. The material calcined at 850° was designated Sample C.

EXAMPLE 4

Vanadation of 450° Calcined Material

A solution was prepared by blending 0.23 grams of $NH_4VO_3$ with 6.22 grams of deionized water. The proportions of the solution had been carefully chosen to provide a pH in the range of about 6 to about 8 in order to stabilize metavanadate ions ($VO_3^{1-}$). The solution was thoroughly mixed with 4.82 grams of Sample B which was described in Example 2 above. The resulting mixtures was dried under vacuum at 70° C. overnight and then calcined at 450° to produce a vanadated material designated Sample D. Based on the proportions of reactants, it is estimated that the theoretical formula of Sample D is approximately:

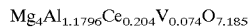

Subsequent analyses of Sample D were reported as B.E.T. surface area of 192 $m^2/g$, average pore radius of 81 Angstrom units, micropore area of 50 $m^2/g$, and micropore volume of 0.023 cc/g.

EXAMPLE 5

Vanadation of 850° Calcined Material The procedure of Example 4 was performed again except that Sample C described in Example 3 above was vanadated and calcined. The resulting material was designated Sample E. The estimated theoretical formula for Sample E is identical to the formula presented above for Sample D.

Subsequent analyses indicated that Sample E had a B.E.T. surface area of 119 m²/g, an average pore radius of 91 Angstrom units, a micropore area of 6 m²/g, and a micropore volume of 0.003 cc/g. High resolution electron photomicrography of Sample D, supported by scanning electron microscope analyses, indicated that a significant fraction of the microcrystallites present were composed of a solid solution phase having aluminum oxide dispersed in a magnesium oxide crystal lattice.

EXAMPLE 6

Reactant Limited Vanadation

A relatively dilute vanadate solution was prepared by blending 0.11 grams of $NH_4VO_3$ with 4.0 liters of deionized water. The proportions of the solution had been chosen to provide a pH in the range which stabilizes the metavanadate form of the anion. The dilute solution was thoroughly mixed with 4.82 grams of Sample B which was described in Example 2 above. The resulting mixture was filtered, then dried under vacuum at 70° C. overnight and calcined at 450° to produce a partially vanadated material.

Based on the proportions of reactants, it is estimated that the theoretical formula of the partially vanadated material is approximately:

$$Mg_4Al_{1.796}Ce_{0.2042}V_{0.035}O_{7.088}$$

EXAMPLE 7

Performance Testing of Sample D

A portion of Sample D which was described in Example 4 above was subjected to thermal gravimetric analysis during sequential periods of exposure to an oxidizing gas mixture including 5000 ppm sulfur dioxide, 2 percent oxygen and balance helium and to a reducing gas mixture including 50 percent hydrogen and balance helium. The temperature of the oxidizing gas was about 735° C., while the temperature of the reducing gas was about 640° C. Each exposure was preceded by a period of helium purge at the corresponding temperature.

Figure 2:
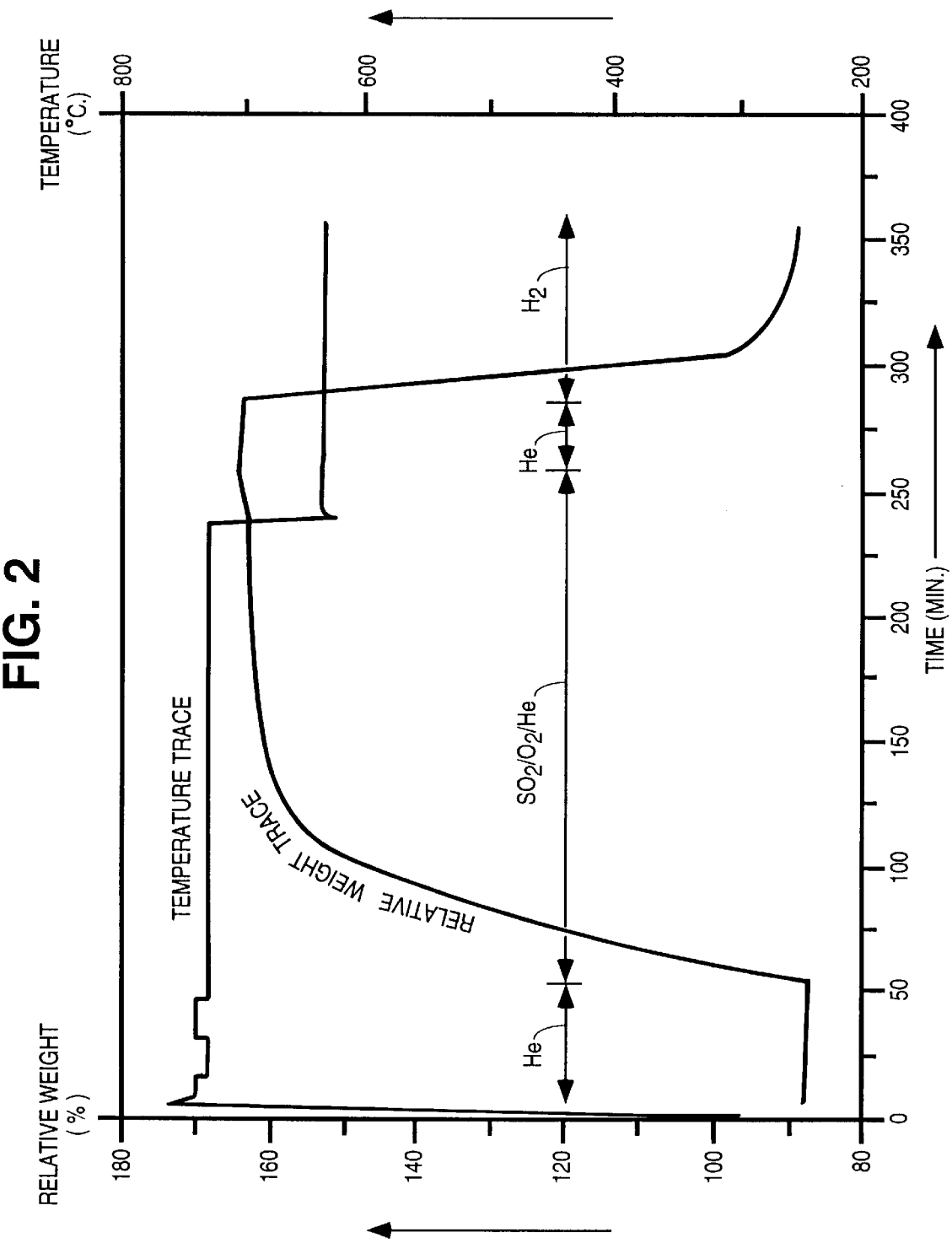
FIG. 2 is a dual-axis graph showing a relative weight for the product of Example 4 as a function of time (in minutes) during the course of a thermal gravimetric analysis having a temperature trace which is also presented in FIG. 2.

The sample, which weighed 19.7363 milligrams at the outset, exhibited a relative weight increase of 84.6 percent during ninety minutes of exposure to the oxidizing gas mixture. An almost immediate relative weight decrease of 87.3 percent was observed on exposure to the reducing gas mixture. FIG. 2 depicts the relationship of relative sample weight, expressed as a percentage of the weight at the outset, to elapsed time in minutes for one oxidizing and reducing cycle of the thermal gravimetric analysis for Sample D.

EXAMPLE 8

Performance Testing of Sample E

Figure 3:
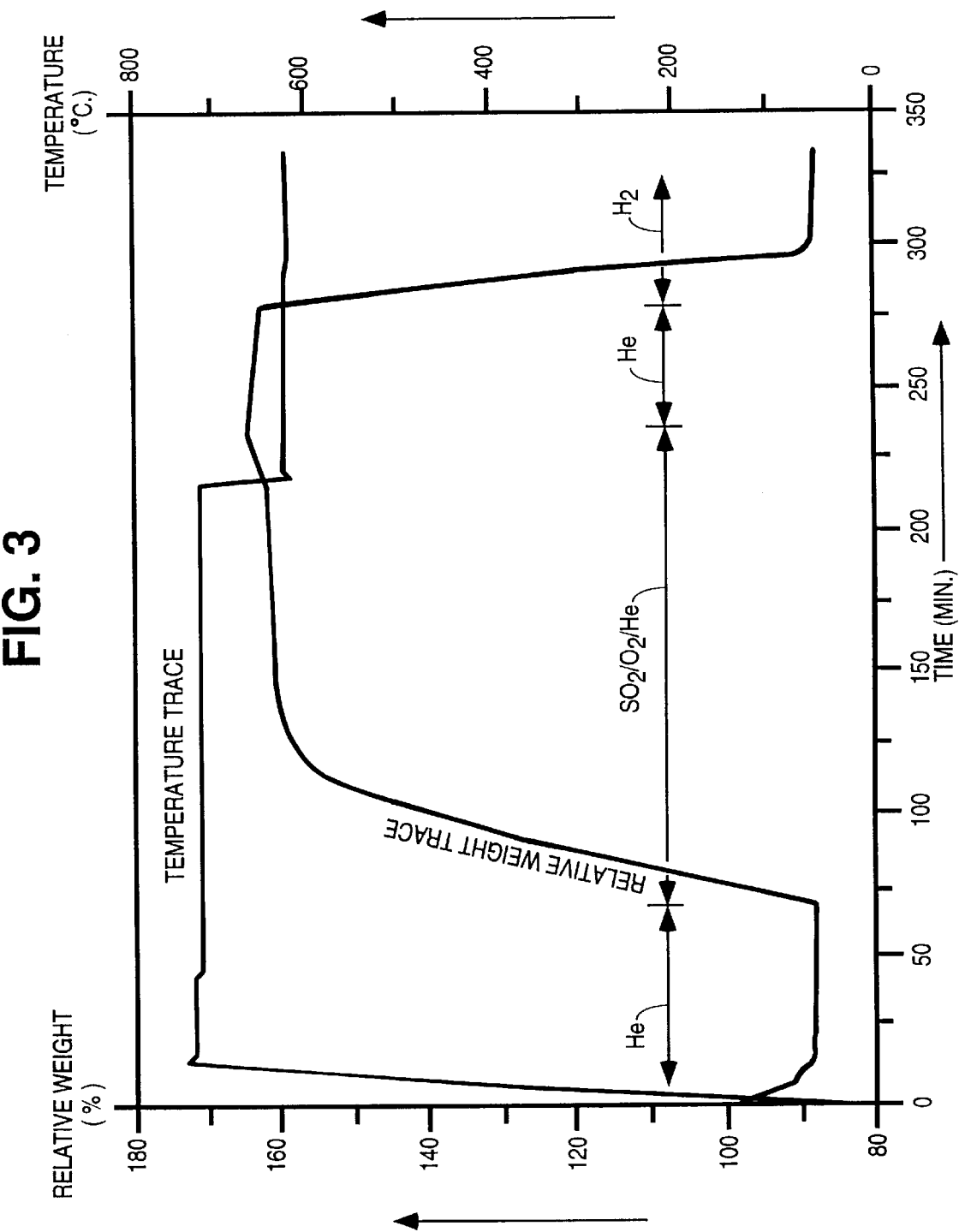
FIG. 3 is a dual-axis graph which depicts a relative weight for the product of Example 5 as a function of time during the course of a thermal gravimetric analysis having a temperature trace which is also presented in FIG. 3.

The procedure of Example 7 above was repeated with a portion of Sample E which was described in Example 5 above. The sample weighed 20.89 milligrams at the outset. The sample increased in relative weight by 83.3 percent while exposed to the oxidizing gas mixture, and decreased in relative weight by 84.1 percent weight during the exposure to the reducing gas, based on the weight at the outset. FIG. 3 shows the relationship of relative sample weight, expressed as a percentage of the weight at the outset, to elapsed time in minutes for one oxidizing and reducing cycle of the thermal gravimetric analysis for Sample E.

Figure 4:
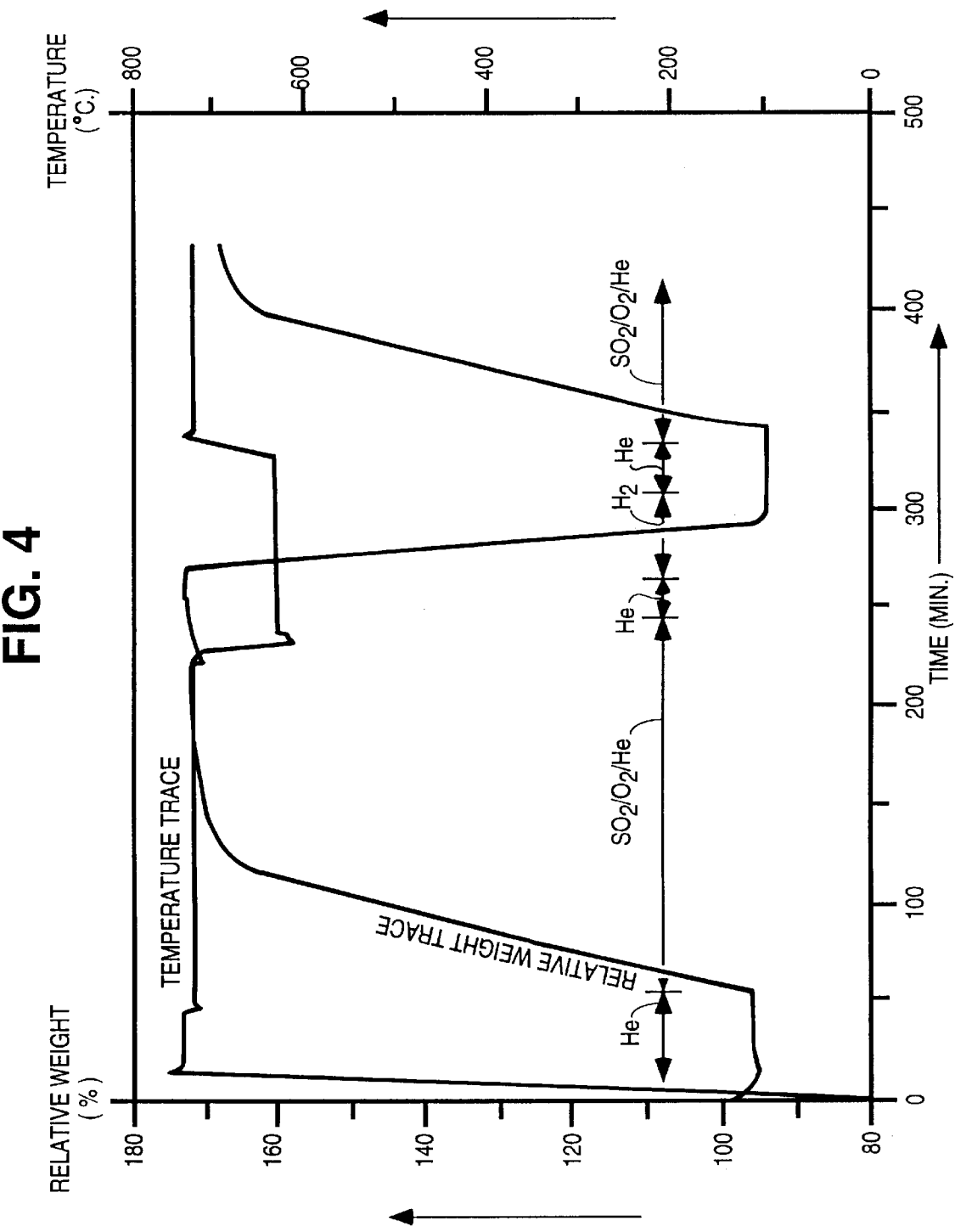
FIG. 4 is a dual-axis graph exhibiting a relative weight trace and a temperature trace for a second cycle and a third cycle of thermal gravimetric analysis performed on the product of Example 3.

Some of the Sample E material subjected to thermal gravimetric analysis was also tested for thermal gravimetric performance during a second oxidizing and reducing cycle and a third oxidizing and reducing cycle. The sample weight at the outset of the second cycle was 16.8988 milligrams, with the third cycle following immediately after the second. Relative sample weight as of a function of elapsed time as well as a temperature trace for the second and third cycles of Sample E is presented graphically in FIG. 4.

EXAMPLE 9

Performance Testing of a Spinel Absorbent

A widely used sulfur oxide absorbent based on a spinel composition was commercially obtained and designated Sample F for the purpose of performing a control experiment. Sample F is not of the present invention. However, Sample F was subjected to one oxidizing and reducing cycle of the performance test described in Example 7 and Example 8 above. Sample F exhibited at 47.0 percent increase in relative weight over a period of 90 minutes exposure to the oxidizing gas containing sulfur dioxide. Exposure to the reducing gas containing hydrogen caused an almost immediate relative weight decrease of 50.3 percent.

The results of performance testing produced in Example 7, Example 8 and Example 9 are presented in Table I, below:

TABLE I

| Absorbent Sample | Cycle | Relative Weight Increase (percent) | Time (minutes) | Relative Weight Decrease (percent) | Time (minutes) |
|---|---|---|---|---|---|
| D | 1 | 84.6 | 90 | 87.3 | rapid |
| E | 1 | 83.3 | 90 | 84.1 | rapid |
|   | 2 | 76.2 | 90 | 77.4 | rapid |
|   | 3 | 78.3 | 90 | not studied | — |
| F | 1 | 47.0 | 90 | 50.3 | rapid |

Inspection of Table I reveals that the absorbents prepared according to the present invention, Sample D and Sample E, demonstrated a significantly larger capacity for sulfur dioxide absorption than did the control sample, Sample F. Additionally, Sample E of the present invention continued to absorb more sulfur dioxide on its second and third oxidizing cycles than did control Sample F on its initial oxidizing cycle. The results are especially surprising because Sample F is a commercially obtained absorbent which is representative of widely accepted and currently utilized absorbent technology.

EXAMPLE 10

Preparation of $Mg_4Al_2(OH)_{12}CO_3$ from Metal Salt Solutions—With Filtering and Washing A layered mixed double hydroxide material was prepared from metal salt solutions to serve as an illustration of previously known methods and to provide a reference sample. The metal salts employed were magnesium nitrate and aluminum nitrate. More specifically, 200 milliliters of deionized water, 10.0 grams of sodium carbonate, and 28.0 grams of sodium hydroxide were charged to a flask equipped with a mechanical stirrer and a water cooled reflux condenser. 160 milliliters of deionized water, 51.3 grams of $Mg(NO_3)_2 \cdot 6H_2O$, and 37.5 grams of $Al(NO_3)_3 \cdot 9H_2O$ were blended and added drop-wise to the flask with continuous stirring over for a period of about one hour. The formation of a gelatinous mixture was observed. The mixture was heated under reflux at 85° C. while being swept with a nitrogen purge for about fifteen hours. The mixture was subsequently cooled, filtered, washed repeatedly utilizing about one liter of deionized water with each washing, and dried overnight under vacuum at 70° C.

The dried material, prepared from metal salts for use as a reference sample, was designated Sample G. An x-ray diffraction analysis of the material indicated that Sample G possessed a typical hydrotalcite-type structure having an interlayer spacing, widely termed a d(003) value, of approximately 7.6 Angstroms. Given this x-ray-ray diffraction data, known formulae for hydrotalcite-type structures, and the reagents which were charged as described above, one may reasonably conclude that the dried material contained a substantial proportion of hydrotalcite-type clay having the formula $Mg_4Al_2(OH)_{12}CO_3$.

Assuming that all of the magnesium nitrate and aluminum nitrate in the reagents reacted to completion to form hydrotalcite-type clay, one may calculate that the gelatinous mixture, before filtering or water washing, contained an amount of byproduct salt totaling 240 weight per cent on a dry basis, as compared to the weight of the hydrotalcite-type clay. In the above described procedure, most of this byproduct salt was carried for disposal with the filtrate water and spent wash water.

EXAMPLE 11

$Mg_4Al_2(OH)_{12}CO_3$ from a Divalent Metal Oxide Slurry and an Alumina Sol—Without Filtering or Washing A hydrotalcite clay material was prepared in the following manner from reagents which contained 50 weight percent excess sodium carbonate. It is calculated that this amount of excess sodium carbonate gives rise to 3.63 grams of waste sodium carbonate in the product, which corresponds to 3.99 weight percent of the salts which would have been produced as byproducts utilizing the classical all-nitrate preparation method, as described above in Example 10.

A three-neck round bottom flask equipped with a thermometer, a water cooled reflux condenser and a mechanical stirrer was charged with a first combination having a pH of 10.8 and including 80 milliliters of distilled water and 10.91 grams (0.1029 mol) of sodium carbonate. A second combination having a pH of 10.9 was prepared by blending 566 milliliters of distilled water and 11.33 grams (0.2744 mol) of magnesium oxide. A third combination contained 512 grams of an aqueous mixture consisting of 7.0 grams (0.0686 mol) of alumina which was introduced in the pseudo boehmite form (at 75% alumina content), 1.75 grams of acetic acid, and water. The second and third combinations were simultaneously added to the flask with stirring via separate addition funnels over a period of ten minutes.

After the additions were complete, a pH alkalinity of 10.5 was measured in the contents of the flask. The contents were stirred continuously, while formation of a gelatinous mixture took place in the flask. The gelatinous mixture was heated to 80° C. for 22 hours with continuous stirring. After that time, the gelatinous mixture was cooled and tested for pH alkalinity, which was determined to be 12.4. A portion of the gelatinous mixture was then removed and designated Sample H1. The remaining portion of the gelatinous mixture was designated Sample H2, which is discussed in Example 12, below.

No effort was made to filter the mixture or water wash the removed portion, designated Sample Hi, in contrast to the procedures described in Example 10 above. Subsequently, the removed portion mixture was dried overnight at 80° C. under vacuum. The dried product, which weighed 1.04 grams, was designated Sample I, and subsequently analyzed by x-ray diffraction techniques.

Figure 5:
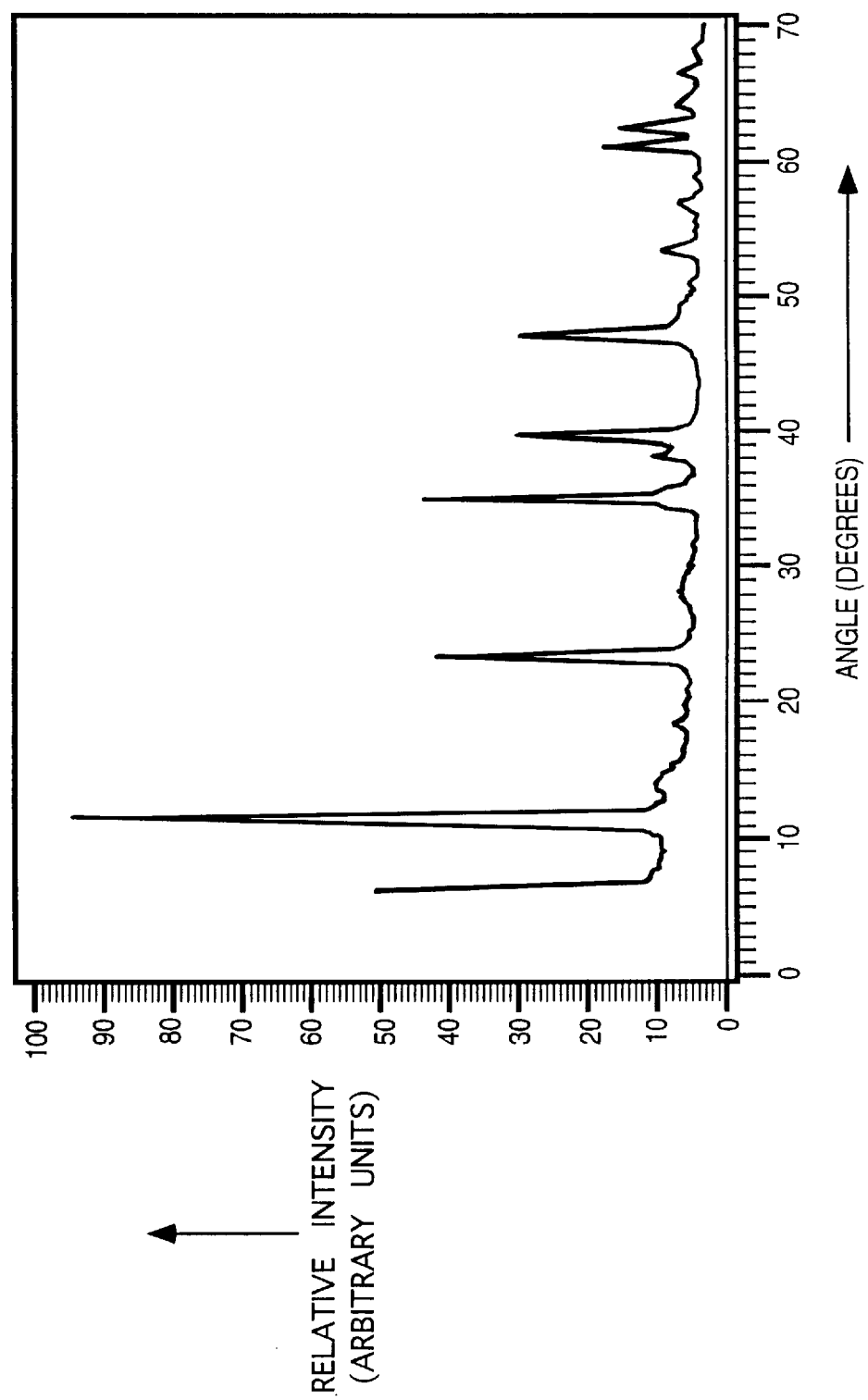
FIG. 5 is the trace of an x-ray diffraction analysis for the product of Example 11, which was prepared from a divalent metal oxide slurry, an alumina sol, and a sodium carbonate solution without filtering or water washing. Even though the product was prepared from reagents which contained a relatively low concentration of metal salts, as compared to reagents utilized in conventional preparation methods, the trace demonstrates a relationship between an observed x-ray intensity (in arbitrary units) and a sample orientation angle (in degrees) that is characteristic of a mixed layered double hydroxide structure.

The trace obtained from Sample I by x-ray diffraction is presented as FIG. 5, which is a graph showing observed relative x-ray intensity on an arbitrary scale as a function of sample orientation angle in degrees. Significantly, the trace indicates that Sample I is substantially composed of layered double hydroxides having a hydrotalcite-type structure. For example, the most intense of the peaks evident in FIG. 5 occurs at a sample orientation angle of 11.5°, indicating a layered structure having an interlayer spacing of 7.8 Angstrom units. Similarly, the other peaks visible in FIG. 5 correspond to various structural dimensions commonly associated with hydrotalcite-type structures. On the basis of known formulae for hydrotalcite-type structures, the amounts of the reagents employed, and the x-ray diffraction results, one may reasonably conclude that the product is rich in the layered double hydroxide having the formula $Mg_4Al_2(OH)_{12}CO_3$.

Moreover, the layered mixed double hydroxide composition, which was produced without the benefit of any filtering or water washing steps, was remarkably free of salts and salt byproducts. Taking the formula of layered double hydroxide as $Mg_4Al_2(OH)_{12}CO_3$ and assuming complete reaction of the magnesium oxide and alumina, one may calculate that the amount of sodium carbonate present, as compared to the amounts of the other reagents, was 50 percent in excess of the amount stoichiometrically required. It is well-known that neither magnesium oxide nor alumina forms a salt in contact with an aqueous phase having an pH alkalinity of 7 or more. No salts other than sodium carbonate were present in the reagents.

FIG. 1 demonstrates that a divalent metal hydroxide slurry can, under appropriate conditions, be combined with a trivalent metal oxide sol to produce a layered mixed double hydroxide composition.

EXAMPLE 12

$Mg_4Al_2(OH)_{12}CO_3$ from a Divalent Metal Oxide Slurry and an Alumina Sol—Without Filtering or Washing The remaining portion of the gelatinous mixture, Sample H2 which was described above in Example 11, was filtered once and washed three times. Each of the washes utilized one liter of water, for a total of three liters of wash water. The filtrate was evaporated to dryness, and a white residue weighing only 8.9 grams was isolated. A significant proportion of this residue was determined by x-ray diffraction to be sodium carbonate. This result compares favorably with the theoretical excess amount of sodium carbonate charged, which is calculated as 3.63 grams. X-ray diffraction analysis also indicated that much of the balance of the residue was composed of a clay material similar to the clay designated Sample I in Example 11, above.

A filter cake remained after filtration and washing of Sample H2. The filter cake was dried and found to weigh 27.9 grams. X-ray diffraction confirmed that the filter cake was composed of a clay material similar to Sample I.

EXAMPLE 13

$Mg_4Al_{1.87}Ce_{0.19}(OH)_{13.92}(VO_3)_{0.2}$ from a Divalent Metal Oxide Slurry, an Alumina Sol, Cerium Nitrate, and Ammonium Vanadate It is now hypothesized that the procedure described in Example 11 above is substantially repeated, except that the first combination includes 400 milliliters of distilled water and 1.60 grams of ammonium vanadate, instead of 80 milliliters of distilled water and 10.91 grams (0.1029 mol) of sodium carbonate; the second combination includes 566 milliliters of distilled water and 11.33 grams (0.2744 mol) of magnesium oxide; and the third combination is composed of 500 milliliters of water, 5.66 grams of $Ce(NO_3)_3 \cdot 6H_2O$, and a sol containing 6.54 grams of alumina introduced in boehmite form.

It is theorized that calcining the product at a temperature of about 500° C. for 15 hours produces a heat treated composition useful for absorbing sulfur dioxide. Inspection of the calcined product by high resolution electron microscope reveals that the product contains microcrystallites, and that a significant fraction of the microcrystallites are composed of a solid solution phase having aluminum oxide dispersed in a magnesium oxide crystal lattice.

For the purposes of the present specification, "predominantly" is defined as mostly or more often than not. In quantitative terms, predominantly denotes about 50 percent or more. "Substantially" is defined as being present in significant proportions or having sufficient frequency so as to measurably affect macroscopic qualities of an associated compound or system. Where the amount required for such significant and measurable impact is not clear, substantially is synonymous with about 20 percent or more. "Essentially" is defined as absolutely but allowing for some small variations which have a negligible effect on macroscopic qualities and final outcome. Variations of about one percent can often exist without any detectable change in essential qualities.

Examples have been presented and hypotheses advanced in order to better communicate certain facets of the invention. The scope of the invention is determined solely by the appended claims, and is not limited in any way by the examples or the hypotheses. Moreover, practitioners who study the teachings set forth above will undoubtedly receive suggestions which bring to mind many additional aspects of the invention. Such obviously similar aspects, whether or not expressly described herein, are intended to be within the scope of the present claims.

That which is claimed is:

1. A process for manufacturing a composition which comprises:

blending water; about two molar parts of a divalent metal compound which is not a salt and includes a divalent metal selected from the group consisting of magnesium, calcium, zinc, strontium and barium; and about one molar part in sum of an aluminum compound which is not a salt and a trivalent metal compound which is not a salt and includes a trivalent metal selected from the group consisting of cerium, lanthanum, iron, chromium, vanadium, and cobalt; and about one-half to about one molar part of a water soluble interstitial anion precursor to produce a mixture;

heating the mixture to a temperature in the range of about 50° to about 100° C. for at least about one hour;

recovering from the mixture an anionic layered mixed hydroxide;

calcining the recovered layered mixed hydroxide for not less than about one hour at a temperature of about 450° C. or hotter, to produce a dehydrated material which is essentially devoid of interstitial anions;

mixing the dehydrated material with an aqueous solution including about 0.01 to less than two molar parts of a metalate salt containing vanadate, tungstenate, or molybdate anions to produce a slurry, the solution also including an amount of an alkalinity control agent appropriate to stabilize the vanadate, tungstenate, or molybdate anions in monometalate, dimetelate, trimetalate or tetrametalate form; and recovering solids from the slurry and calcining the solids to produce an at least partially collapsed composition suitable for use as a sulfur oxide absorbent which is substantially composed of solid solution microcrystallites having aluminum oxide dispersed in an oxide of the divalent metal and of spinel base microcrystallites, each of the microcrystallites having the greatest linear dimension in the range of about 0.1 to about 30 nanometers.

2. The process of claim 1 wherein the metalate salt is blended in an amount sufficient to produce a concentration of the vanadate, tungstenate, or molybdate anion in the liquid portion of the slurry which is in the range of about 0.01 to about 1 molar and wherein the vanadate, tungstenate, or molybdate anion is a vanadate.

3. The process of claim 1 wherein the divalent metal is magnesium and the trivalent metal is cerium.

4. The process of claim 1 wherein the microcrystallites are additionally composed of trivalent metal oxide phase microcrystallites.

5. The process of claim 1 wherein the amount of the interstitial anion precursor blended corresponds to about one-half to about one molar part of carbonate anions in the mixture;

the recovered layered mixed hydroxide includes interstitial carbonate anions; and the dehydrated material is essentially devoid of interstitial carbonate anions.

6. A process for manufacturing a composition for use as a sulfur oxide absorbent which comprises:

blending water; about two molar parts of a divalent metal compound which is not a salt and includes a divalent metal selected from the group consisting of magnesium, calcium, zinc, strontium and barium; about one molar part in sum of an aluminum compound which is not a salt and a trivalent metal compound which is not a salt and includes a trivalent metal selected from the group consisting of cerium, lanthanum, iron, chromium, vanadium, and cobalt; about 0.01 to less than two molar parts of a metalate salt containing vanadate, tungstenate, or molybdate anions; and an amount of an alkalinity control agent appropriate to stabilize the anions in monometalate, dimetalate, trimetalate or tetrametalate form to produce a mixture;

heating the mixture to a temperature in the range of about 50° to about 100° C. for at least about one hour;

recovering from the mixture an anionic layered mixed hydroxide; and calcining the recovered layered mixed hydroxide for not less than about one hour at a temperature of about 450° C. or hotter, to produce an at least partially collapsed composition for use as a sulfur oxide absorbent which is substantially composed of solid solution microcrystallites having aluminum oxide dispersed in an oxide of the divalent metal and of spinel phase microcrystallites, each of the microcrystallites having the greatest linear dimension in the range of about 0.1 to about 30 nanometers.

7. The process of claim 6 wherein the metalate salt is blended in an amount sufficient to produce a concentration of the vanadate, tungstenate, or molybdate anion in the liquid portion of the slurry which is in the range of about 0.01 to about 1 molar and wherein the vanadate, tungstenate, or molybdate anion is a vanadate.

8. The process of claim 6 wherein the divalent metal is magnesium and the trivalent metal is cerium.

9. The process of claim 6 wherein the microcrystallites are additionally composed of trivalent metal oxide phase microcrystallites.

10. A process for manufacturing a composition which comprises:

blending water; about two molar parts of a divalent metal compound which is not a salt and includes a divalent metal selected from the group consisting of magnesium, calcium, zinc, strontium and barium; and about one molar part in sum of an aluminum compound which is not a salt and a trivalent metal compound which is not a salt and includes a trivalent metal selected from the group consisting of cerium, lanthanum, iron, chromium, vanadium, and cobalt; and about one-half to about one molar part of a water soluble interstitial anion precursor selected from the group consisting of carbonates, hydroxides, sulfites, sulfates, chlorides, and nitrates to produce a mixture;

heating the mixture to a temperature in the range of about 50° to about 100° C. for at least about one hour;

recovering from the mixture an anionic layered mixed hydroxide having an interstitial anion selected from the group consisting of $CO_3^{2-}$, $OH^-$, $SO_3^{2-}$, $SO_4^{2-}$, $Cl^-$ and $NO_3^-$;

calcining the recovered layered mixed hydroxide for not less than about one hour at a temperature of about 450° C. or hotter, to produce a dehydrated material which is essentially devoid of the anions selected from the group consisting of $CO_3^{2-}$, $OH^-$, $SO_3^{2-}$, $SO_4^{2-}$, $Cl^-$ and $NO_3^-$;

mixing the dehydrated material with an aqueous solution including about 0.01 to less than two molar parts of a metalate salt containing vanadate, tungstenate, or molybdate anions to produce a slurry, the solution also including an amount of an alkalinity control agent appropriate to stabilize the vanadate, tungstenate, or molybdate anions in monometalate, dimetelate, trimetalate or tetrametalate form; and recovering solids from the slurry and calcining the solids to produce an at least partially collapsed composition for use as a sulfur oxide absorbent which is substantially composed of solid solution microcrystallites having aluminum oxide dispersed in an oxide of the divalent metal and of spinel base microcrystallites, each of the microcrystallites having the greatest linear dimension in the range of about 0.1 to about 30 nanometers.

11. The process of claim 10 wherein the metalate salt is blended in an amount sufficient to produce a concentration of the vanadate, tungstenate, or molybdate anion in the liquid portion of the slurry which is in the range of about 0.01 to about 1 molar and wherein the vanadate, tungstenate, or molybdate anion is a vanadate.

12. The process of claim 10 wherein the divalent metal is magnesium and the trivalent metal is cerium.

13. The process of claim 10 wherein the microcrystallites are additionally composed of trivalent metal oxide phase microcrystallites.

* * * * *

UNITED STATES PATENT AND TRADEMARK OFFICE
CERTIFICATE OF CORRECTION

Page 1 of 3

PATENT NO.: 5,843,862

DATED: December 1, 1998

INVENTOR(S): Alakananda Bhattacharyya

It is certified that error appears in the above-identified patent and that said Letters Patent is hereby corrected as shown below:

| Col. | Line | |
|---|---|---|
| 11 | 57 | "$VO_3-.$" should read --$VO_3^{1-}.$-- |
| 13 | 30 | "net ionic charge associated with 3;" --net ionic charge associated with J;-- |
| 14 | 21 | "oxides from he absorbent" should read --oxides from the absorbent-- |
| 16 | 66 | "Calcined Material The procedure" new paragraph commences with "The procedure" |
| 17 | 30 | "$Ce_{0.2042}$" should read --$Ce_{0.204}$-- |
| 18 | 7 | "weight as of a function of elapsed time" should read --weight as a function of elapsed time-- |
| 18 | 66 | "stirring over for a period of" should read --stirring over a period of-- |

UNITED STATES PATENT AND TRADEMARK OFFICE
CERTIFICATE OF CORRECTION

PATENT NO.: 5,843,862
DATED: December 1, 1998
INVENTOR(S): Alakananda Bhattacharyya It is certified that error appears in the above-identified patent and that said Letters Patent is hereby corrected as shown below:

| Col. | Line | |
|---|---|---|
| 2 | 5 | "$CO_3^{2-}$, $CrO_4^-$, $HPO_4^{2-}$, $HPO_4^{2-}$, $MnO_4^-$" should read --$CO_3^{2-}$, $SO_4^{2-}$, $SiO_3^{2-}$, $CrO_4^-$, $HPO_4^{2-}$, $MnO_4^-$-- |
| 2 | 63 | "and at least on other compound" should read --and at least one other compound-- |
| 5 | 16 | "HV2O$_7$" should read --$HV_2O_7$-- |
| 5 | 57 | "eradicated by cacining" should read --eradicated by calcining-- |
| 6 | 10 | "replace at least partially replace" should read --at least partially replace-- |
| 7 | 65-66 | "v is the net anionic charge associated with $VO_3^{1-}$ is -1." should read --v is the net ionic charge. The net ionic charge associated with $VO_3^{1-}$ is -1.-- |

UNITED STATES PATENT AND TRADEMARK OFFICE
CERTIFICATE OF CORRECTION

PATENT NO.: 5,843,862
DATED: December 1, 1998
INVENTOR(S): Alakananda Bhattacharyya It is certified that error appears in the above-identified patent and that said Letters Patent is hereby corrected as shown below:

| Col. | Line | | |
|------|------|---|---|
| 19 | 65 | "designated Sample Hi" <br> --designated Sample H1-- | should read |

Signed and Sealed this

First Day of June, 1999

Attest:

Q. TODD DICKINSON

*Attesting Officer*     *Acting Commissioner of Patents and Trademarks*